United States Patent
Stiers

(10) Patent No.: US 11,917,323 B2
(45) Date of Patent: Feb. 27, 2024

(54) SYSTEM AND METHOD FOR MODIFYING MEDIA STREAMS USING METADATA

(71) Applicant: TIVO CORPORATION, San Jose, CA (US)

(72) Inventor: Todd Stiers, Berkeley, CA (US)

(73) Assignee: TiVo Corporation, San Jose, CA (US)

( * ) Notice: Subject to any disclaimer, the term of this patent is extended or adjusted under 35 U.S.C. 154(b) by 0 days.

(21) Appl. No.: 16/372,294

(22) Filed: Apr. 1, 2019

(65) Prior Publication Data

US 2019/0230313 A1 Jul. 25, 2019

Related U.S. Application Data

(63) Continuation of application No. 13/530,310, filed on Jun. 22, 2012, now Pat. No. 10,250,841, which is a continuation of application No. 12/181,186, filed on Jul. 28, 2008, now abandoned.

(60) Provisional application No. 61/049,739, filed on May 1, 2008.

(51) Int. Cl.
| | |
|---|---|
| H04N 5/76 | (2006.01) |
| H04N 9/82 | (2006.01) |
| G06Q 30/02 | (2012.01) |
| G06F 16/9535 | (2019.01) |
| H04N 9/804 | (2006.01) |

(52) U.S. Cl.
CPC ............ *H04N 5/76* (2013.01); *H04N 9/8205* (2013.01); *H04N 9/8211* (2013.01); *H04N 9/8233* (2013.01); *H04N 9/8042* (2013.01)

(58) Field of Classification Search
None
See application file for complete search history.

(56) References Cited

U.S. PATENT DOCUMENTS

| | | | |
|---|---|---|---|
| 6,721,741 B1 * | 4/2004 | Eyal | .................. G06F 16/40 |
| 6,760,721 B1 | 7/2004 | Chasen et al. | |
| 6,983,287 B1 | 1/2006 | Jayanti et al. | |
| 7,206,748 B1 | 4/2007 | Gruse et al. | |
| 7,222,163 B1 | 5/2007 | Girouard et al. | |
| 7,281,034 B1 | 10/2007 | Eyal | |
| 7,796,779 B1 | 9/2010 | Strong et al. | |
| 10,250,841 B2 | 4/2019 | Stiers | |

(Continued)

OTHER PUBLICATIONS

B.R., Arun Kumar, et al. RTSP Audio and Video Streaming for QoS in Wireless Mobile Devices. Jan. 5, 2008, pdfs.semanticscholar.org/7562/a93084e2e028c109e76d2de06cd0be5848c8.pdf. (Year: 2008).*

(Continued)

*Primary Examiner* — Kito R Robinson
*Assistant Examiner* — Shacole C Tibljas
(74) *Attorney, Agent, or Firm* — Haley Guiliano LLP

(57) ABSTRACT

Real-time metadata tracks recorded to media streams allow search and analysis operations in a variety of contexts. Search queries can be performed using information in real-time metadata tracks such as closed captioning, sub-title, statistical tracks, miscellaneous data tracks. Media streams can also be augmented with additional tracks. The metadata tracks not only allow efficient searching and indexing, but also allow insertion of content specific advertising during appropriate portions of a media stream based on the content of the metadata tracks.

21 Claims, 6 Drawing Sheets

(56) References Cited

U.S. PATENT DOCUMENTS

| | | | | |
|---|---|---|---|---|
| 2001/0039571 | A1* | 11/2001 | Atkinson | G06Q 30/02 709/217 |
| 2002/0124262 | A1* | 9/2002 | Basso | H04N 7/17336 725/110 |
| 2004/0030682 | A1 | 2/2004 | Porter et al. | |
| 2004/0139025 | A1* | 7/2004 | Coleman | G06F 21/6254 705/51 |
| 2005/0260970 | A1* | 11/2005 | Losquin | G01R 31/382 455/343.5 |
| 2006/0047692 | A1 | 3/2006 | Rosenblum et al. | |
| 2006/0184980 | A1* | 8/2006 | Cole | G11B 27/034 725/88 |
| 2007/0055689 | A1 | 3/2007 | Rhoads et al. | |
| 2007/0136263 | A1* | 6/2007 | Williams | G06F 16/951 |
| 2007/0136742 | A1 | 6/2007 | Sparrell | |
| 2007/0237098 | A1 | 10/2007 | Wang | |
| 2007/0299870 | A1 | 12/2007 | Finch | |
| 2008/0147608 | A1 | 6/2008 | Sarukkai | |
| 2008/0275906 | A1 | 11/2008 | Rhoads et al. | |
| 2008/0284910 | A1* | 11/2008 | Erskine | H04N 5/9206 348/E7.001 |
| 2009/0094113 | A1 | 4/2009 | Berry et al. | |
| 2009/0187941 | A1* | 7/2009 | Smith | H04N 21/23424 725/35 |
| 2009/0260030 | A1* | 10/2009 | Karlsson | G06Q 30/02 725/32 |
| 2012/0263438 | A1 | 10/2012 | Stiers | |
| 2013/0070636 | A1* | 3/2013 | Farley | H04W 4/38 370/254 |
| 2019/0230313 | A1 | 7/2019 | Stiers | |

OTHER PUBLICATIONS

U.S. Appl. No. 12/181,186, Final Office Action dated Apr. 29, 2011.
U.S. Appl. No. 12/181,186, Non Final Office Action dated Sep. 30, 2011.
U.S. Appl. No. 12/181,186, Non Final Office Action dated Nov. 12, 2010.
U.S. Appl. No. 12/181,186, Notice of Non Compliant Amendment dated Mar. 1, 2012.
U.S. Appl. No. 12/181,186, Response filed Mar. 10, 2011 to Non Final Office Action dated Nov. 12, 2010.
U.S. Appl. No. 12/181,186, Response filed Jul. 22, 2011 to Final Office Action dated Apr. 29, 2011.
U.S. Appl. No. 12/181,186, Response filed Dec. 27, 2011 to Non Final Office Action dated Sep. 30, 2011.
U.S. Appl. No. 12/181,186, Restriction Requirement dated May 23, 2012.
U.S. Appl. No. 12/181,186, Supplemental Response filed Mar. 29, 2012 to Non Final Office Action dated Sep. 30, 2011.
U.S. Appl. No. 13/530,310, Advisory Action dated Jul. 14, 2016, 3pgs.
U.S. Appl. No. 13/530,310, Advisory Action dated Aug. 31, 2017, 5pgs.
U.S. Appl. No. 13/530,310, Examiner Interview dated Jul. 22, 2016, 3pgs.
U.S. Appl. No. 13/530,310, Examiner Interview Summary dated Feb. 13, 2017, 3pgs.
U.S. Appl. No. 13/530,310, Examiner Interview Summary dated May 20, 2015, 3pgs.
U.S. Appl. No. 13/530,310, Examiner Interview Summary dated May 23, 2016, 3pgs.
U.S. Appl. No. 13/530,310, Examiner Interview Summary dated Jul. 11, 2016, 3pgs.
U.S. Appl. No. 13/530,310, Final Office Action dated Apr. 26, 2017, 16pgs.
U.S. Appl. No. 13/530,310, Final Office Action dated Jun. 27, 2016, 16pgs.
U.S. Appl. No. 13/530,310, Final Office Action dated Aug. 31, 2018, 6pgs.
U.S. Appl. No. 13/530,310, Final Office Action dated Nov. 30, 2012.
U.S. Appl. No. 13/530,310, Non Final Office Action dated Jan. 29, 2016, 15pgs.
U.S. Appl. No. 13/530,310, Non Final Office Action dated Jun. 4, 2013, 16pgs.
U.S. Appl. No. 13/530,310, Non Final Office Action dated Oct. 26, 2016, 18pgs.
U.S. Appl. No. 13/530,310, Non Final Office Action dated Nov. 3, 2017, 20pgs.
U.S. Appl. No. 13/530,310, Notice of Allowance dated Nov. 15, 2018, 9pgs.
Kumar, Arun B.R.,., et al. RTSP Audio and Video Streaming for QoS in Wireless Mobile Devices, UCSNS International Journal of Computer Science and Network Security, vol. 8,. No. 1, pp. 96-101. Jan. 2008.

* cited by examiner

| RTP Packet Stream 301 | | | | | | | | | | | | | | | | |
|---|---|---|---|---|---|---|---|---|---|---|---|---|---|---|---|---|
| Timestamp 303 | 6 | 6 | 6 | 7 | 8 | 9 | 10 | 11 | 11 | 12 | 13 | 14 | 15 | 16 | 17 | 17 |
| Sequence Number 305 | 4303 | 4304 | 4305 | 4306 | 4307 | 4308 | 4309 | 4310 | 4311 | 4312 | 4313 | 4314 | 4315 | 4316 | 4317 | 4318 |
| Marker 307 | 0 | 0 | 0 | 0 | 0 | 0 | 0 | 0 | 0 | 0 | 0 | 0 | 0 | 0 | 0 | 0 |
| Data Frame 309 | I | I | I | P | B | P | P | I | I | P | P | B | P | B | I | I |

RTP Packet Stream 401

| | | | | | | | |
|---|---|---|---|---|---|---|---|
| Timestamp 403 | 6 | 6 | 6 | 7 | 8 | 9 | 10 |
| Sequence Number 405 | 4303 | 4304 | 4305 | 4306 | 4307 | 4308 | 4309 |
| Marker 407 | 0 | 0 | 0 | 0 | 0 | 0 | 0 |
| Data Frame 409 | I | I | I | P | B | P | P |

RTP Sequence Removed 421

| | | | | | | | |
|---|---|---|---|---|---|---|---|
| | 11 | 11 | 12 | 13 | 14 | 15 | 16 |
| | 4310 | 4311 | 4312 | 4313 | 4314 | 4315 | 4316 |
| | 0 | 0 | 0 | 0 | 0 | 0 | 0 |
| | I | I | P | P | B | P | B |

RTP Sequence Inserted 411

| | | | | | | | | |
|---|---|---|---|---|---|---|---|---|
| | 11 | 11 | 12 | 13 | 14 | 15 | 16 | |
| | 4310 | 4311 | 4312 | 4313 | 4314 | 4315 | 4316 | |
| | 0 | 0 | 0 | 0 | 0 | 0 | 0 | |
| | I | I | B | B | P | P | B | |

| 17 | 17 |
|---|---|
| 4318 | 4319 |
| 0 | 0 |
| I | I |

| 16 |
|---|
| 4317 |
| 0 |
| B |

SYSTEM AND METHOD FOR MODIFYING MEDIA STREAMS USING METADATA

CROSS-REFERENCE TO RELATED APPLICATIONS

This application is a continuation to U.S. patent application Ser. No. 13/530,310, filed Jun. 22, 2012, now U.S. Pat. No. 10,250,841, which is a continuation of U.S. patent application Ser. No. 12/181,186, filed Jul. 28, 2008, which claims priority of U.S. Provisional Application No. 61/049,739, filed May 1, 2008, all which are incorporated by reference herein in entireties.

TECHNICAL FIELD

The present disclosure relates to a search system using real-time media metadata tracks.

DESCRIPTION OF RELATED ART

A variety of conventional mechanisms allow search and analysis of data. For example, search algorithms can perform indexing of data included in disparate files to allow efficient search and retrieval. Media players can analyze data included in video clip headers and digital video disc (DVD) introductions to provide information to users. Furthermore, users can scour media catalogues and guides for text based information on media content.

However, conventional mechanisms for searching media content and other data have limitations. Consequently, it is desirable to provide improved techniques and mechanisms for performing media data searches.

BRIEF DESCRIPTION OF THE DRAWINGS

The disclosure may best be understood by reference to the following description taken in conjunction with the accompanying drawings, which illustrate particular embodiments.

FIG. 3 illustrates one example of an RTP stream.

FIG. 4 illustrates one example of modification of an RTP stream including removal and insertion of packets.

DESCRIPTION OF EXAMPLE EMBODIMENTS

Figure 1:
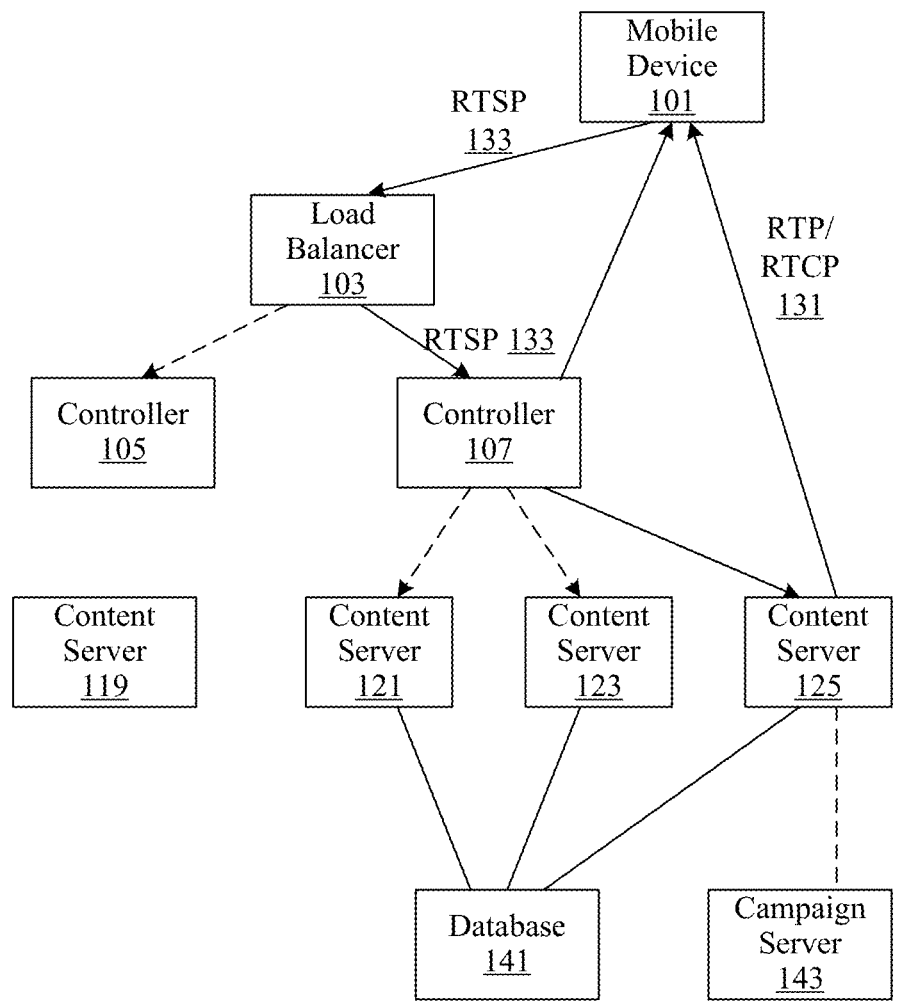
FIG. 1 illustrates an exemplary system for use with embodiments of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular operations and pipelines. However, it should be noted that the techniques of the present invention apply to a variety of operations and pipelines. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Real-time metadata tracks recorded to media streams allow search and analysis operations in a variety of contexts. Search queries can be performed using information in real-time metadata tracks such as closed captioning, sub-title, statistical tracks, miscellaneous data tracks. Media streams can also be augmented with additional tracks. The metadata tracks not only allow efficient searching and indexing, but also allow insertion of content specific advertising during appropriate portions of a media stream based on the content of the metadata tracks.

EXAMPLE EMBODIMENTS

The media streams that are delivered usually include at least an audio track and a video track, but the media streams may include more. For example, media streams may also include captions, subtitles, and real-time metadata real-time metadata describing activity relating directly to the content presented on the other tracks. Where this metadata track is represented as text, such as captions, it could be used to drive searches against ad inventories for timely, specific offers, interactions, time appropriate commercials, and banners for display along with the actual media playback.

According to various embodiments, a mobile player device itself has a real-time state that could be viewed as just another "track" of metadata. Location, temperature, battery condition, network performance, local-time, anything else happening on the device itself could be used to help filter the searches further to make them more relevant and useful to the viewer. These searches could be driven in real-time, with results optionally recorded as yet another time.

According to various embodiments, as media is played, available metadata (captions, tracks, online chat) is used to make queries a line at a time, or word or however fast the metadata is available. The query results are then used to display information back to the viewer, perhaps as a matching banner ad, or an interactive link, a customized commercial, or other asset as determined by the search engine rules. Recording of the results can be used for future playback if caching or archival of the current state is desired. Real-time query results can be used to leverage the latest information from the search engine being queried. Player disposition (location, date/time, temperature) could be used to refine search query and results at the user level.

In particular embodiments, with this technology, more frequent and highly contextual advertising search and results are possible. Rather than using the title or summary information for a search, the entire media stream can be used to drive search by including real time metadata, such as captions, chat responses, or editors notes. Multiple language tracks in existing DVDs can be used to query for secondary, related information and/or ads, supporting additional customization. If recorded in real time, the search results can be played on subsequent playback while bypassing the search functionality. The record feature acts as a cache and allows ads to be better produced/validated/verified. According to various embodiments, long tail content where not recorded can be intentionally searched on each playback to generate the latest query results available from the respective search engine.

According to various embodiments, leveraging the mobile player disposition information allows further refinement of search and results to include immediately relevant queries, or to be recorded as a media track itself. These impressions could represent the highest value to advertiser and user alike. In particular embodiments, this provides an ad driven media organization with the ability to sell more advertising in smaller, focused amounts using more frequent searches with more relevant information.

In still other examples, a user can search a metadata track for specific search terms. Based on the search terms, a specific portion of the media stream is returned. In some examples, the portion of the media stream returned is a portion where are character says particular words in the search terms.

FIG. 1 is a diagrammatic representation illustrating one example of a system that can use the techniques and mechanisms of the present invention. According to various embodiments, content servers 119, 121, 123, and 125 are configured to provide media content to a mobile device 101 using protocols such as RTP and RTCP. Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content mobile devices. Session management itself may include far fewer transactions. Consequently, a controller can handle a far larger number of mobile devices than a content server can. In some examples, a content server can operate simultaneously with thousands of mobile devices, while a controller performing session management can manage millions of mobile devices simultaneously.

By separating out content streaming and session management functions, a controller can select a content server geographically close to a mobile device 101. It is also easier to scale, as content servers and controllers can simply be added as needed without disrupting system operation. A load balancer 103 can provide further efficiency during session management using RTSP 133 by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources about devices such as mobile device 101. The information can be profile information associated with various users of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a user on a mobile device 101 would be interested in viewing.

According to various embodiments, the content servers 119, 121, 123, and 125 are also receiving media streams from content providers such as satellite providers or cable providers and sending the streams to devices using RTP 131. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101 using RTP 131. In particular examples, the content server 125 obtains profile information from campaign server 143.

In some examples, the content server 125 can also obtain profile information from other sources, such as from the mobile device 101 itself. Using the profile information, the content server can select a clip from a database 141 to provide to a user. In some instances, the clip is injected into a live stream without affecting mobile device application performance. In other instances, the live stream itself is replaced with another live stream. The content server handles processing to make the transition between streams and clips seamless from the point of view of a mobile device application. In still other examples, advertisements from a database 141 can be intelligently selected from a database 141 using profile information from a campaign server 143 and used to seamlessly replace default advertisements in a live stream. Content servers 119, 121, 123, and 125 have the capability to manipulate RTP packets to allow introduction and removal of media content.

Figure 2:
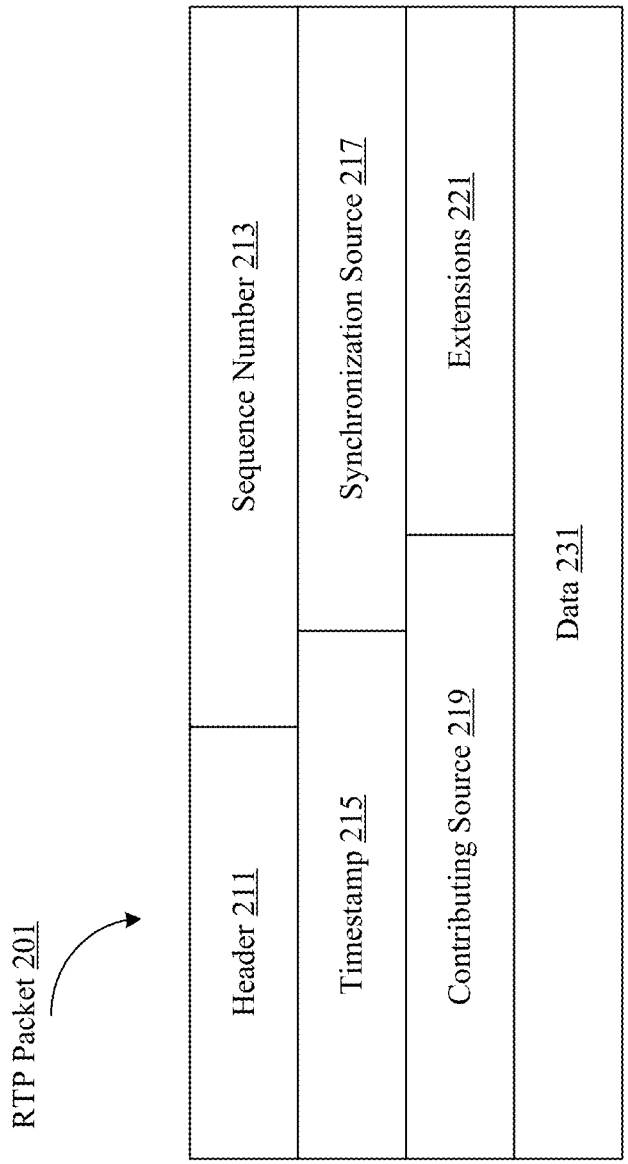
FIG. 2 illustrates one example of a Real-Time Transport Protocol (RTP) packet.

FIG. 2 illustrates one example of an RTP packet. An RTP packet 201 includes a header 211. According to various embodiments, the header 211 includes information such as the version number, amount of padding, protocol extensions, application level, payload format, etc. The RTP packet 201 also includes a sequence number 213. Client applications receiving RTP packets expect that the sequence numbers for received packets be unique. If different packets have the same sequence number, erroneous operation can occur. RTP packets also have a timestamp 215 that allows jitter and synchronization calculations. Fields 217 and 219 identify the synchronization source and the contributing source. Extensions are provided in field 221.

According to various embodiments, data 231 holds actual media data such as MPEG frames. In some examples, a single RTP packet 201 holds a single MPEG frame. In many instances, many RTP packets are required to hold a single MPEG frame. In instances where multiple RTP packets are required for a single MPEG frame, the sequence numbers change across RTP packets while the timestamp 215 remains the same across the different RTP packets. Different MPEG frames include I-frames, P-frames, and B-frames. I-frames are intraframes coded completely by itself. P-frames are predicted frames which require information from a previous I-frame or P-frame. B-frames are bi-directionally predicted frames that require information from surrounding I-frames and P-frames.

Because different MPEG frames require different numbers of RTP packets for transmission, two different streams of the same time duration may require different numbers of RTP packets for transmission. Simply replacing a clip with another clip would not work, as the clips may have different numbers of RTP packets and having different impacts on the sequence numbers of subsequent packets.

According to various embodiments, each track of metadata can be represented in a stream of RTP packets for transport/recording and playback within a subsequent RTSP session. As background, the client player negotiates which RTP tracks to set up during negotiation of an RTSP session with a RTSP/RTP server. In particular embodiments, the client player has the ability to synchronize and use tracks it is requesting. It should be recognized that a variety of mechanisms can be used to packetize media in their native track formats into RTP, and many ways to record new metadata back into a file are contemplated. It should be noted that a new metadata track can be added to the disk content as new streams of RTP packets are synchronized to the audio and video RTP packet streams. Recording metadata tracks can occur on a client recording during playback or on the server during delivery, or in combination.

FIG. 3 illustrates one example of an RTP packet stream that may be used with the techniques of the present invention. An RTP packet stream 301 includes individual packets having a variety of fields and payload data. According to various embodiments, the fields include a timestamp 303, sequence 505, marker 307, etc. The packets also include payload data 309 holding MPEG frames such as I, P, and B-frames. Timestamps for different packets may be the same. In particular examples, several packets carrying portions of the same I-frame have the same time stamp. However, sequence numbers are different for each packet. Marker bits 307 can be used for different purposes, such as signaling the starting point of an advertisement.

According to various embodiments, packets with sequence numbers 4303, 4304, and 4305 carrying portions of the same I-frame and have the same timestamp of 6. Packets with sequence numbers 4306, 4307, 4308, and 4309 carry P, B, P, and P-frames and have timestamps of 7, 8, 9, and 10 respectively. Packets with sequence numbers 4310 and 4311 carry different portions of the same I-frame and both have the same timestamp of 11. Packets with sequence numbers 4312, 4313, 4314, 4315, and 4316 carry P, P, B, P, and B-frames respectively and have timestamps 12, 13, 14, 15, and 16. It should be noted that the timestamps shown in FIG. 3 are merely representational. Actual timestamps can be computed using a variety of mechanisms.

For many audio encodings, the timestamp is incremented by the packetization interval multiplied by the sampling rate. For example, for audio packets having 20 ms of audio sampled at 8,000 Hz, the timestamp for each block of audio increases by 160. The actual sampling rate may also differ slightly from this nominal rate. For many video encodings, the timestamps generated depend on whether the application can determine the frame number. If the application can determine the frame number, the timestamp is governed by the nominal frame rate. Thus, for a 30 f/s video, timestamps would increase by 3,000 for each frame. If a frame is transmitted as several RTP packets, these packets would all bear the same timestamp. If the frame number cannot be determined or if frames are sampled a periodically, as is typically the case for software codecs, the timestamp may be computed from the system clock While the timestamp is used by a receiver to place the incoming media data in the correct timing order and provide playout delay compensation, the sequence numbers are used to detect loss. Sequence numbers increase by one for each RTP packet transmitted, timestamps increase by the time "covered" by a packet. For video formats where a video frame is split across several RTP packets, several packets may have the same timestamp. For example, packets with sequence numbers 4317 and 4318 have the same timestamp 17 and carry portions of the same I-frame.

FIG. 4 illustrates one example of RTP packet stream modification. An RTP packet stream 401 includes individual packets having a variety of fields and payload data. According to various embodiments, the fields include a timestamp 403, sequence 405, marker 407, etc. The packets also include payload data 409 holding MPEG frames such as I, P, and B-frames. Timestamps for different packets may be the same. In particular examples, several packets carrying portions of the same I-frame have the same time stamp. However, sequence numbers are different for each packet. Marker bits 407 can be used for different purposes, such as signaling the starting point of an advertisement. According to various embodiments, metadata searches allow the introduction of targeted advertising that can be inserted seamlessly into an RTP stream.

According to various embodiments, packets with sequence numbers 4303, 4304, and 4305 carrying portions of the same I-frame and have the same timestamp of 6. Packets with sequence numbers 4306, 4307, 4308, and 4309 carry P, B, P, and P-frames and have timestamps of 7, 8, 9, and 10 respectively. According to various embodiments, a content server removes multiple packets from an RTP packet stream 401, including packets with sequence numbers 4310 through 4316. The packets with sequence numbers 4310 and 4311 carry different portions of the same I-frame and both have the same timestamp of 11.

Packets with sequence numbers 4312, 4313, 4314, 4315, 4316 carry P, P, B, P, and B-frames respectively and have timestamps 12, 13, 14, 15, and 16. The spliced stream now ends at packet with sequence number 4309 carrying a P-frame. A B-frame is included in packet having sequence number 4307. It should be noted that B-frames sometimes may depend on information included in a subsequent I-frame which has been removed. Although having a few B-frames lacking reference frames is not extremely disruptive, it can sometimes be noticed. Therefore, the techniques of the present invention recognize that in some embodiments, the last packets left in a stream prior to splicing should be an I-frame or a P-frame.

According to various embodiments, now that a portion of the RTP stream has been removed, an RTP sequence 411 can be inserted. In particular examples, the RTP sequence inserted 411 begins with an I-frame for subsequent P and B-frames to reference. Without an I-frame for reference, an RTP sequence inserted may begin with a partial or incomplete picture. The packets for insertion are modified to have sequence numbers following the last sequence number of spliced packet stream 401. RTP insertion sequence 411 has sequence numbers 4310-4317 corresponding to packets carrying I, I, I, B, P, P, B, B, frames respectively, with the I-frame carried in three packets with the same time stamp of 11 and the B, P, P, B, an B-frames having timestamps of 12-16 respectively.

For example, packets with sequence numbers 4317 and 4318 have the same timestamp 17 and carry portions of the same I-frame. In some instances, the number of packets in the RTP sequence removed 421 will be exactly the same as the number of packets in the RTP sequence for insertion 411. However, in many instances, the number of packets removed and inserted will differ. For example, some frames may require more than one packet for transmission. Although timestamps can be configured to be the same, so that a 5 second clip can be replaced with another 5 second clip, the number of packets and consequently the sequence numbers can be thrown askew. According to various embodiments, packet with sequence number 4309 is referred to herein as a data stream end point packet. Packet with sequence number 4318 is referred to herein as a data stream restart point packet. Packets with sequence numbers 4310 and 4316 in removed sequence are referred to herein as the removed sequence start packet and the removed sequence end packet respectively. Packets with sequence numbers 4310 and 4316 in the insertion sequence are referred to herein as the insertion sequence start packet and the insertion sequence end packet respectively.

Consequently, the content server maintains a current sequence number per RTP data stream and modified subsequent packets after removing and inserting streams. For example, packets having timestamp 17 are modified to have sequence numbers 4318 and 4319 instead of 4317 and 4318. The content server then proceeds to update subsequent timestamps in the RTP data stream. According to various embodiments, this operation is uniquely performed at a content server because the content server has information about individual mobile devices and also is able to know information about the sequence numbers of an entire content stream. A content provider may not know information about individual mobile devices, whereas a network device or network switch may not receive all data packets in a sequence. Some packets may have been dropped while others may have been transmitted on different paths.

Figure 5:
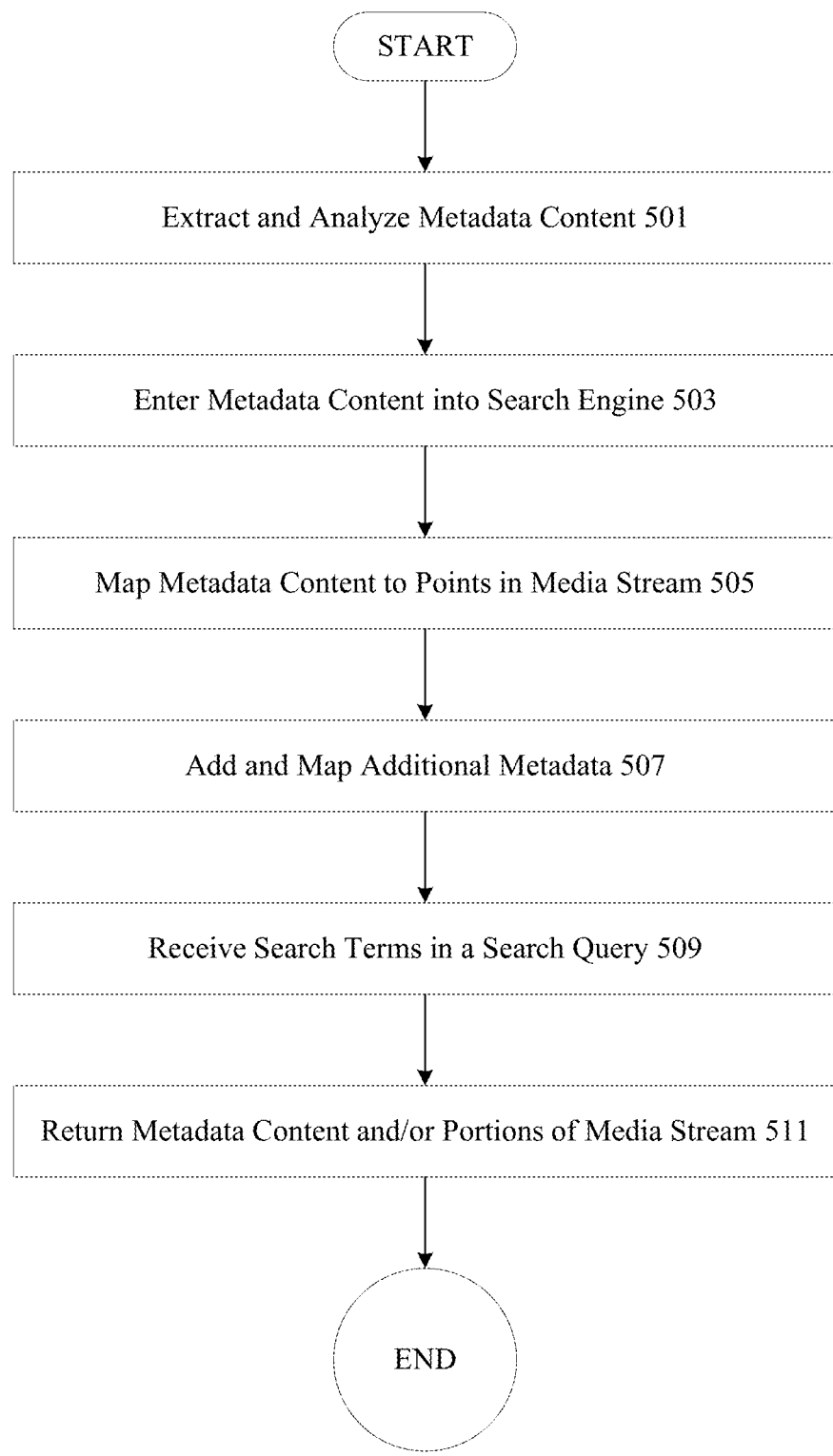
FIG. 5 illustrates one example of metadata content processing.

FIG. 5 is a process flow diagram showing one technique for performing metadata searches. At 501, metadata content for a media stream is extracted and analyzed. At 503, the metadata content is entered into a search engine to allow for indexing and/or later retrieval. In some examples, closed captioning information is indexed to allow searching of programming based on phrases stated during a program. At 505, metadata content is mapped to correspond to particular points in a media stream so that a search will not only retrieve a particular phrase but the video of the actors saying the particular phrase. In particular embodiments, the metadata is time sensitive metadata for a media stream. At 507, additional metadata such as viewer comments can also be added and mapped to particular points in a media stream. For example, a viewer may comment that a particular scene is extremely artistic and enter comments as metadata corresponding to a point in the media stream into a searchable database. At 509, search terms are received in a search query. At 511, metadata content and/or relevant portions of a media stream are returned based on the query.

Figure 6:
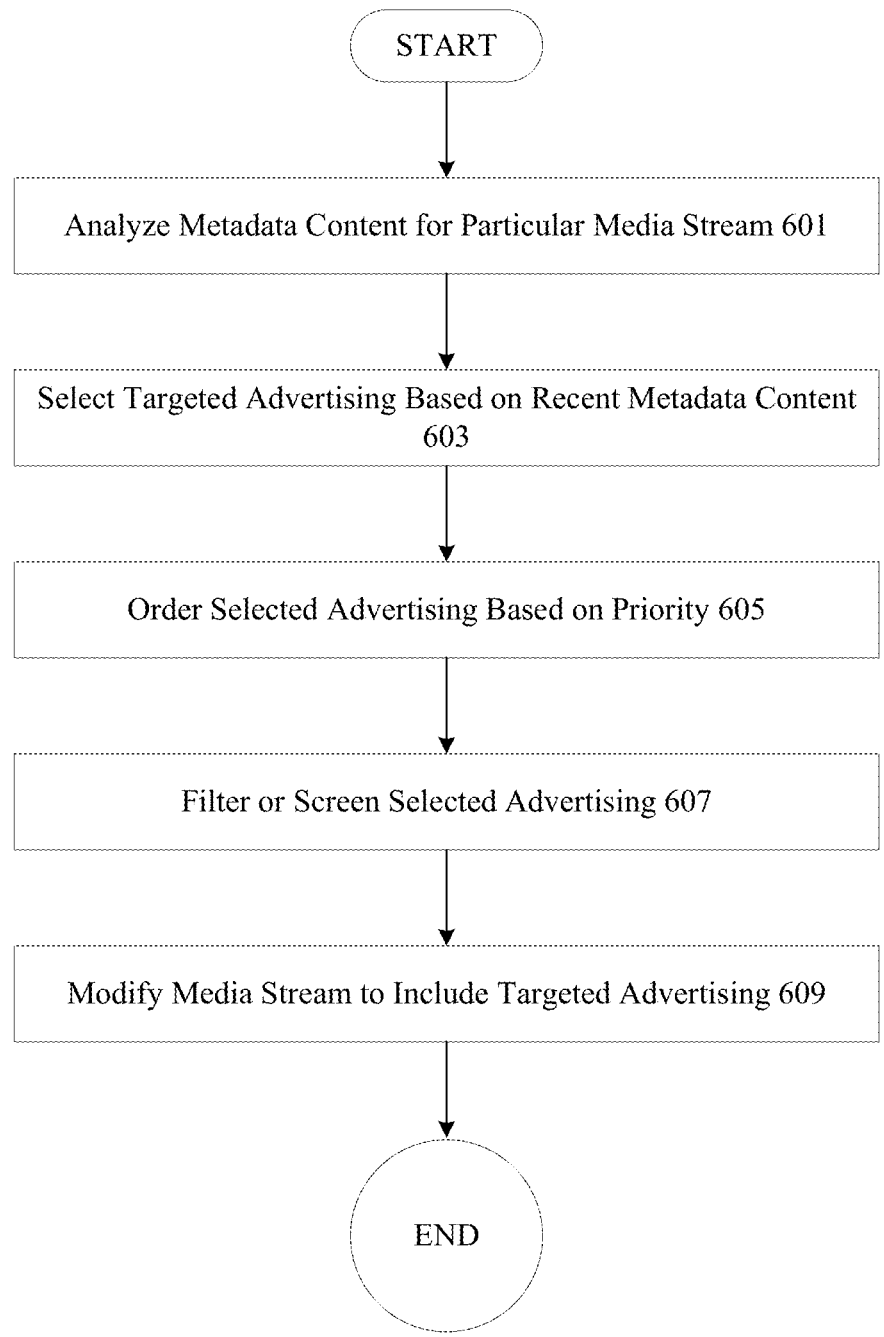
FIG. 6 illustrates an example of advertisement insertion.

FIG. 6 is a process flow diagram showing a technique for inserting targeted advertising. At 601, metadata content for a particular media stream is analyzed. According to various embodiments, analysis is done for only metadata content for an immediate time period such as 10 minutes of a most recently presented stream. At 603, targeted advertising is selected based on recent metadata content such as editorial content and closed captioning. In particular embodiments, advertisements corresponding to search patterns, tags, strings, and sequences may be selected and inserted into the media stream. At 605, selected advertising is ordered based on priority. At 607, additional criteria such as user profiles, device profiles, user preferences, etc. may be used to further filter or screen selected advertising. At 609, the media stream is modified to include targeted advertising. In some examples, the media stream is a live media stream that is dynamically modified to include relevant and targeted advertising. In other examples, the media stream may be a clip stored in a media library.

Although many of the components and processes are described above in the singular for convenience, it will be appreciated by one of skill in the art that multiple components and repeated processes can also be used to practice the techniques of the present invention.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
    selecting, a content server among a plurality of content servers;
    establishing a media streaming session between the content server and a mobile device;
    obtaining, after establishing the media streaming session, one or more of a temperature or battery condition of the mobile device from the mobile device by the content server;
    streaming a media stream from the content server to the mobile device using RTP (Real Time Transport Protocol), the media stream including a video track, an audio track, and a metadata track;
    analyzing metadata content in the metadata track of the media stream;
    analyzing the one or more of the temperature or battery condition of the mobile device;
    indexing metadata content in the metadata track to allow for later retrieval of the metadata content and corresponding video content in the video track, wherein the indexing is performed via entering the metadata content and the one or more of the temperature or battery condition of the mobile device into a search engine;
    selecting targeted advertising for the media stream based on the metadata content and the one or more of the temperature or battery condition of the mobile device, wherein the advertising is maintained in a database;
    modifying, by the content server, the media stream using the one or more of the temperature or battery condition of the mobile device to include selected advertising, wherein modifying includes:
        maintaining a current sequence number for the media stream,
        removing RTP packets with sequence numbers subsequent to the current sequence number from the media stream,
        inserting new RTP packets with modified sequence numbers subsequent to the current sequence number, the new RTP packets corresponding to the selected advertising being inserted into the media stream, and updating sequence numbers of original RTP packets of the media stream that are transmitted to the mobile device after transmitting the inserted new RTP packets, the updated sequence numbers of the original RTP packets being subsequent to the modified sequence numbers of the new RTP packets; and transmitting the modified media stream to the mobile device.

2. The method of claim 1, wherein the one or more of the temperature or battery condition of the mobile device is information directed to attributes internal to the mobile device.

3. The method of claim 1, wherein advertising is selected by using:
closed captioning contents and viewer comments;
editorial contents in the metadata track; or
closed captioning contents, viewer comments, and editorial contents in the metadata track.

4. The method of claim 1, wherein the media stream is modified in real time.

5. The method of claim 1, wherein the media stream is a media clip.

6. The method of claim 1, wherein the video track and the audio track are dynamically modified to include relevant and targeted advertising.

7. The method of claim 1, wherein analyzing metadata content includes analyzing a portion of the metadata track corresponding to only the most recent 10 minutes of the media stream being presented.

8. The method of claim 1, wherein selected advertising is ordered based on priority.

9. A system comprising:
a database configured to maintain advertising;
a content server connected to the database, the content server configured to:
establish a media streaming session between the content server and a mobile device;
obtain, after establishing the media streaming session, one or more of a temperature or battery condition of the mobile device from the mobile device;
stream a media stream to the mobile device using RTP (Real Time Transport Protocol), the media stream including a video track, an audio track, and a metadata track;
analyze metadata content in the metadata track of the media stream;
analyze the one or more of the temperature or battery condition of the mobile device;
index metadata content in the metadata track to allow for later retrieval of the metadata content and corresponding video content in the video track, wherein the indexing is performed via entering the metadata content and the one or more of the temperature or battery condition of the mobile device into a search engine;
select targeted advertising for the media stream based on the metadata content and the one or more of the temperature or battery condition of the mobile device, wherein the advertising is maintained in the database;
modify the media stream using the one or more of the temperature or battery condition of the mobile device to include selected advertising, wherein modifying includes:
maintaining a current sequence number for the media stream,
removing RTP packets with sequence numbers subsequent to the current sequence number from the media stream,
inserting new RTP packets with modified sequence numbers subsequent to the current sequence number, the new RTP packets corresponding to the selected advertising being inserted into the media stream, and
updating sequence numbers of original RTP packets of the media stream that are transmitted to the mobile device after transmitting the inserted new RTP packets, the updated sequence numbers of the original RTP packets being subsequent to the modified sequence numbers of the new RTP packets; and
transmit the modified media stream to the mobile device.

10. The system of claim 9, wherein the one or more of the temperature or battery condition of the mobile device is information directed to attributes internal to the mobile device.

11. The system of claim 9, wherein advertising is selected by using:
closed captioning contents and viewer comments;
editorial contents in the metadata track; or
closed captioning contents, viewer comments, and editorial contents in the metadata track.

12. The system of claim 9, wherein the media stream is recorded in real time.

13. The system of claim 9, wherein the media stream is a media clip.

14. The system of claim 9, wherein the video track and the audio track are dynamically modified to include relevant and targeted advertising.

15. The system of claim 9, wherein analyzing metadata content includes analyzing a portion of the metadata track corresponding to only the most recent 10 minutes of the media stream being presented.

16. The system of claim 9, wherein selected advertising is ordered based on priority.

17. A non-transitory computer readable medium comprising instructions to execute a method, the method comprising:
selecting a content server among a plurality of content servers;
establishing a media streaming session between the content server and a mobile device;
obtaining, after establishing the media streaming session, one or more of a temperature or battery condition of the mobile device from the mobile device by the content server;
streaming a media stream from the content server to the mobile device using RTP (Real Time Transport Protocol), the media stream including a video track, an audio track, and a metadata track;
analyzing metadata content in the metadata track of the media stream;
analyzing the one or more of the temperature or battery condition of the mobile device;
indexing metadata content in the metadata track to allow for later retrieval of the metadata content and corresponding video content in the video track, wherein the indexing is performed via entering the metadata content and the one or more of the temperature or battery condition of the mobile device into a search engine;
selecting targeted advertising for the media stream based on the metadata content and the one or more of the temperature or battery condition of the mobile device, wherein the advertising is maintained in a database;

modifying, by the content server, the media stream using the one or more of the temperature or battery condition of the mobile device to include selected advertising, wherein modifying includes:
 maintaining a current sequence number for the media stream,
 removing RTP packets with sequence numbers subsequent to the current sequence number from the media stream,
 inserting new RTP packets with modified sequence numbers subsequent to the current sequence number, the new RTP packets corresponding to the selected advertising being inserted into the media stream, and
 updating sequence numbers of original RTP packets of the media stream that are transmitted to the mobile device after transmitting the inserted new RTP packets, the updated sequence numbers of the original RTP packets being subsequent to the modified sequence numbers of the new RTP packets; and transmitting the modified media stream to the mobile device.

18. The non-transitory computer readable medium of claim 17, wherein the one or more of the temperature or battery condition of the mobile device is information directed to attributes internal to the mobile device.

19. The non-transitory computer readable medium of claim 17, wherein advertising is selected by using:
 closed captioning contents and viewer comments;
 editorial contents in the metadata track; or
 closed captioning contents, viewer comments, and editorial contents in the metadata track.

20. The non-transitory computer readable medium of claim 17, wherein the media stream is a live media stream.

21. The method of claim 1, further comprising:
 obtaining, after establishing the media streaming session, a network condition of the mobile device; and
 analyzing the network condition for the mobile device;
 wherein the indexing metadata content in the metadata track further includes entering the network condition;
 wherein the selecting targeted advertising for the media stream is further based on the network condition; and
 wherein the modifying the media stream further includes using the network condition to include selected advertising.

* * * * *